United States Patent

Bown et al.

[11] Patent Number: 6,003,795
[45] Date of Patent: Dec. 21, 1999

[54] PREPARATIONS OF SUSPENSIONS OF GROUND PARTICULATE MATERIAL

[75] Inventors: Richard Bown, St. Austell; David Robert Skuse, Truro, both of United Kingdom

[73] Assignee: ECC International Ltd., United Kingdom

[21] Appl. No.: 09/043,053

[22] PCT Filed: Sep. 12, 1996

[86] PCT No.: PCT/GB96/02269

§ 371 Date: Jul. 14, 1998

§ 102(e) Date: Jul. 14, 1998

[87] PCT Pub. No.: WO97/10309

PCT Pub. Date: Mar. 20, 1997

[30] Foreign Application Priority Data

Sep. 12, 1995 [GB] United Kingdom .................... 9518598
Sep. 12, 1995 [GB] United Kingdom .................... 9518602

[51] Int. Cl.$^6$ .................................................. B02C 19/12
[52] U.S. Cl. .................................. 241/16; 241/21; 241/29
[58] Field of Search ............................... 524/425; 241/21, 241/16, 29, 20, 153

[56] References Cited

U.S. PATENT DOCUMENTS 4,325,514  4/1982  Hemingsley ........................ 241/21

4,840,985  6/1989  Gonnet et al. ......................... 524/425

FOREIGN PATENT DOCUMENTS

| 0216002 | 4/1987 | European Pat. Off. . |
| 0595723 | 10/1993 | European Pat. Off. . |
| 55-040715 | 2/1986 | Japan . |
| 2204574 | 4/1991 | United Kingdom . |
| WO 95/25146 | 9/1995 | WIPO . |

*Primary Examiner*—Mark Rosenbaum

[57] ABSTRACT

There is disclosed a method of preparing a concentrated aqueous suspension of a finely ground particulate material by a multistage grinding process in which an aqueous suspension of the particulate material is passed to and treated by grinding in each of a series of grinding stages, wherein a water soluble polycarboxylate dispersing agent for the particulate material is added to the suspension at each of a plurality of dispersion agent addition sites or stages. The invention is characterised in that the aqueous suspension when treated by grinding in at least one of the grinding stages has a pH on the inclusive range 8.5 to 9.8. Using the method described, suspensions can be prepared which are rheologically stable with time, and which contain a relatively high proportion by weight of a finely divided pigment.

9 Claims, 1 Drawing Sheet

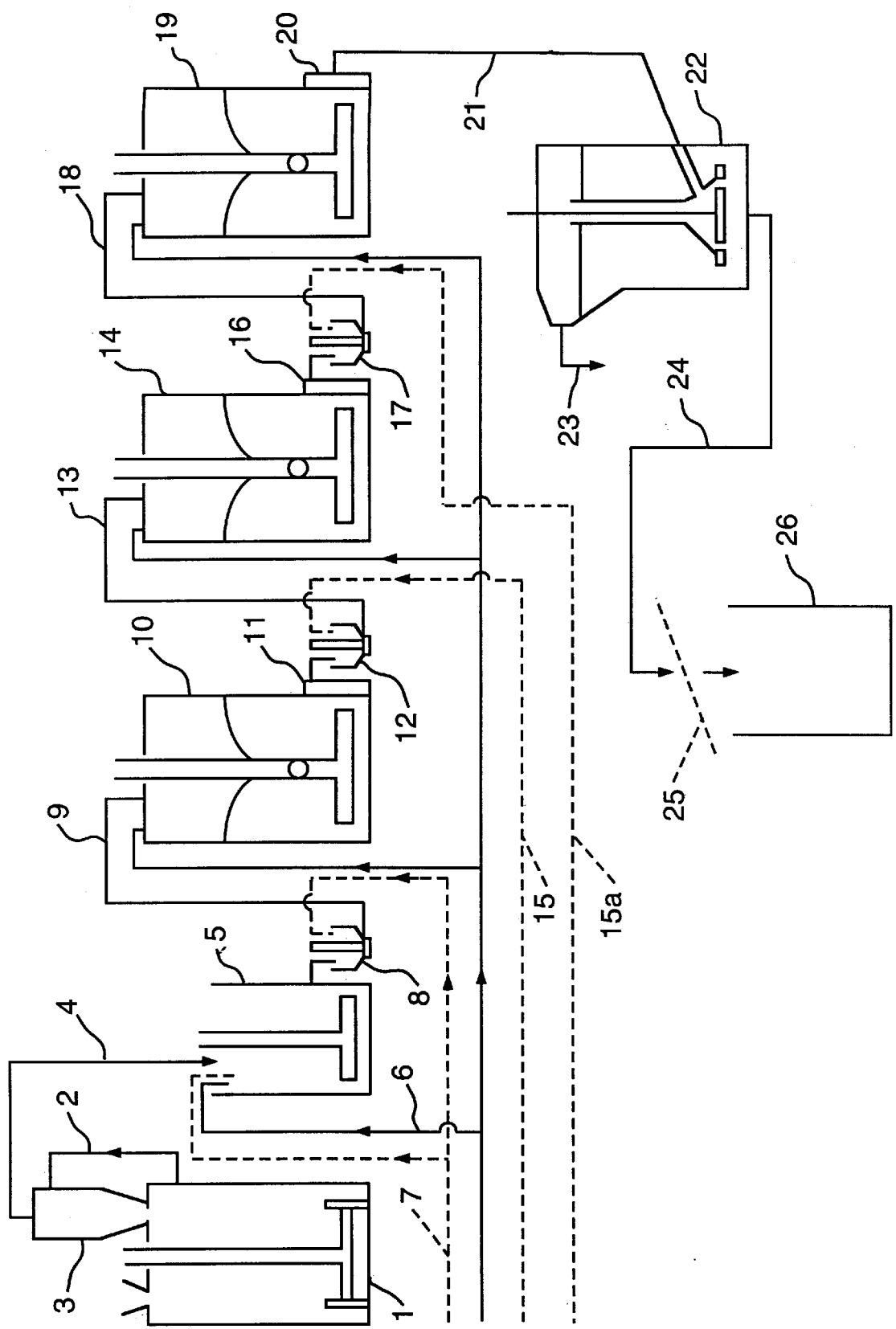

PREPARATIONS OF SUSPENSIONS OF GROUND PARTICULATE MATERIAL

This invention concerns an improved method for preparing an aqueous suspension of an inorganic particulate material such as a finely divided alkaline earth metal pigment, particularly, but not exclusively, a natural calcium carbonate pigment.

Suspensions of alkaline earth metal pigments, especially when the suspension is required for use in a paper coating process, are ideally prepared at the highest possible solids concentration as this minimises both the capacity required in equipment for handling the suspension and the cost of storing and transporting the suspension. Additionally, a more concentrated suspension makes it possible for the paper manufacturer to prepare a paper coating composition having a higher solids concentration, with consequent saving in drying costs.

It is highly desirable in many cases that the pigment which is incorporated into a paper coating composition should have a particle size distribution such that a major portion of the particles have an equivalent spherical diameter ("esd") smaller than 1 μm. The use of such finely divided pigments makes it possible to produce coated paper having very good smoothness and gloss, but also brings with it the disadvantage that, as a general rule, for a given solids concentration, a suspension of a relatively fine pigment is more viscous than a suspension of a relatively coarse pigment. There is also a tendency for aqueous suspensions of fine pigments to form a gel structure on storage with a resultant increase in viscosity with time.

Pigment producers are seeking to provide paper manufacturers with aqueous suspensions which contain a high percentage by weight of a finely divided pigment, but which at the same time have a sufficiently low viscosity to enable the suspension to flow through conduits and to be pumped, and which do not gel to an undesirable extent on prolonged storage.

Aqueous suspensions containing a high percentage by weight of a pigment must inevitably also contain a dispersing agent for the pigment which ensures that the particles of the pigment are in a dispersed, or unaggregated, form rather than being clumped together to form aggregates or flocs. Dispersing agents which are most commonly used for this purpose include anionic polyelectrolytes which are vinyl polymers or copolymers having carboxylic acid groups. Generally these carboxylic acid groups are substantially completely neutralised with alkali metal or ammonium ions. Particularly commonly used dispersing agents are sodium polyacrylates having a weight average molecular weight less than about 20,000 and in which substantially all of the carboxyl groups are neutralised with sodium.

EP-A-0216002 describes a process of beneficiating calcite including subjecting a concentrated slurry of the calcite particles to multistage grinding by passing the slurry in series from an upstream grinding stage through one or more downstream grinding stages wherein each downstream grinding stage is charged with a grinding medium having a particle size finer than the grinding medium of the preceding upstream grinding stage. Grinding media comprising particles of alumina, alumina/silica, or zirconia/silica are disclosed. A dispersing agent, eg. an aqueous solution of a water-soluble polyacrylate, such as sodium polyacrylate, is preferably added to the slurry prior to grinding.

U.S. Pat. No. 4,325,514 discloses a grinding method in which a mineral is wet ground in a first grinding chamber in the absence of a grinding medium. The ground material may be further ground in a second grinding chamber in the presence of a grinding medium. In the first grinding chamber a dispersing agent is required. The use of a dispersing agent in the second grinding chamber is optional.

EP-A-0595723 discloses a grinding process in which a compact mineral (such as calcium carbonate), a lamellar mineral (such as kaolin) and a plastic pigment are co-ground in the presence of a grinding agent in pre-grinding and final grinding steps, both of which are conducted in the same grinding vessel. The final grinding may be conducted in the presence of a colloidal protective agent.

We have found that the procedures described in the prior art for treating inorganic particulate material such as calcium carbonate by multi-stage grinding are not optimum and multi-stage grinding may be improved by the present invention.

According to a first aspect of the present invention there is provided a method of preparing a concentrated aqueous suspension of a finely ground particulate material by a multistage grinding process in which an aqueous suspension of the particulate material is passed to and treated by grinding in each of a series of grinding stages, wherein a water soluble polycarboxylate dispersing agent for the particulate material is added to the suspension at each of a plurality of dispersing agent addition sites or stages and characterised in that the aqueous suspension when treated by grinding in at least one of the grinding stages has a pH in the inclusive range 8.5 to 9.8.

We have found that by adjusting the pH to be in the said range in at least one of the grinding stages, especially in at least the last of the series of grinding stages, and preferably also in the penultimate grinding stage, efficient grinding of the suspension at high solids levels can be achieved. As described further and exemplified hereinafter, such grinding can be improved compared with the grinding obtained using the prior art multi-stage process.

Preferably, in the method according to the present invention, the pH of the aqueous suspension in the last grinding stage, is in the inclusive range 8.5 to 9.5, especially in the inclusive range 8.8 to 9.2. Ways in which the pH may be adjusted to be in the required range are described hereinafter.

There may be a dispersant addition site associated with each grinding stage in the method according to the present invention.

Each dispersing agent addition site may comprise a grinding vessel or mill at which grinding is also to be carried out in a grinding stage but we prefer to add the dispersing agent to the suspension before the suspension reaches the grinding stage, eg. at a site associated with a pump for pumping the suspension to the next grinding stage.

The inorganic particulate material may comprise an insoluble salt of an alkaline earth metal, eg. of calcium. The material after treatment by the method according to the present invention may be intended for use as a pigment, in particular a paper coating pigment which may be formulated into a paper coating composition in a manner known per se.

Addition of the dispersing agent at each of a plurality of sites or stages in the method according to the present invention allows the condition of the suspension to be ground, especially the pH of the suspension, to be adjusted as the suspension is passed to and treated at the various stages of the series of grinding stages for example in the manner described hereinafter.

The method according to the present invention may be carried out as a continuous process or as a batch process. Preferably, the process is a continuous process in which the aqueous suspension to be treated is continuously passed between the grinding stages which are carried out in separate, interconnected grinding vessels. Such a continuous process is known as cascade grinding, progressively finer solid material being ground being allowed to pass in the suspension down the grinding chain. There may be provided between the grinding stages and after the last grinding stage means for separating the solid material by particle size, eg. a sieve or screen, so that only a finer separated fraction is passed on.

Each of the grinding stages may be conducted in one or more grinding vessels. For example the first stage may be conducted in a single vessel and one or more of the subsequent stages may be carried out in a plurality of, eg. two or three, vessels connected in series or in parallel.

The grinding carried out at each grinding stage may comprise either (a) medium attrition grinding using a known grinding medium such as granules of alumina or silica or a mixed oxide system; or (b) autogenous grinding in which the particles grind each other without the assistance of an additional grinding medium. We prefer that at least the last stage in the process comprises medium attrition grinding.

In each of the grinding stages wherein the suspension is medium attrition ground, it is preferably ground with a particulate grinding medium which comprises particles not larger than 2 mm and not smaller than 0.1 mm. More preferably the particles of the grinding medium are not larger than 1 mm and not smaller than 0.25 mm. After the or each medium attrition grinding stage, the particulate material being ground may be separated from the grinding medium.

The addition of the dispersing agent at each addition site may be carried out as a single dose or, especially where the process is a continuous process, as a plurality of separate doses or as a continuous addition.

In the method according to the present invention the grinding stages may be preceded by one or more other treatment steps which may include at least one preliminary comminution step. For example, the inorganic particles entering the first grinding stage may have a particle size distribution such that at least 30% (and preferably no more than about 75%) by weight have an esd less than 10 $\mu$m and not less than 20% have an esd less than 2 $\mu$m. These particles may be obtained by treatment of mineral chips, eg. of chalk or marble, up to 100 mm in diameter, normally of diameter in the range 10 mm to 30 mm. The treatment of mineral chips may include as a preliminary comminution step treatment in a mill, eg. a hammer mill, or wet autogenous grinding as for example described in U.S. Pat. No. 4,325,514 or by preliminary wet grinding.

In a preliminary wet grinding step, a dispersing agent may or may not be used, depending upon the solids concentration of the suspension. If the solids concentration is above about 50% by weight a dispersing agent must normally be used. The dispersing agent in such a preliminary step is preferably a polycarboxylate.

For example, the preliminary grinding step may be any one of the following:

high solids concentration (above 50% by weight, and preferably in the range from 65% to 80% by weight) wet autogenous grinding with a dispersing agent;

low solids concentration (below 50% by weight) wet grinding without a dispersing agent, but with or without a grinding medium of chemical composition different from that of the particulate material; in this case a dewatering step would be needed as part of the method according to the present invention preferably before the first dispersant addition is made; or dry grinding with no dispersing agent followed by mixing with water containing a dispersing agent or to which a dispersing agent is subsequently added to form a high solids concentration suspension.

We prefer that the method according to the present invention is carried out as an at least three grinding stage grinding process in which the last three stages are medium attrition grinding stages each carried out after a separate dispersing agent addition has been made.

These three stages may be preceded by one of the preliminary steps, eg. preliminary comminution steps, described above. If a preliminary comminution step is included then we prefer that it is a wet autogenous grinding step. The overall process will then comprise (at least) a four grinding stage process embodying the present invention.

In such three or four stage processes, the particle size distribution of the particulate material to be ground in the aqueous suspension when delivered as a feed suspension in the first of the last three grinding stages is typically such that at least 20% by weight of the particles have an esd smaller than 2 $\mu$m and at least 30% (preferably no more than 75%) have an esd smaller than 10 $\mu$m, as measured by means of a SEDIGRAPH 5000 instrument, manufactured by Micrometrics Corporation. The feed from that grinding stage to the next grinding stage preferably has a particle size distribution such that from 50% to 80% by weight of the particles have an esd, smaller than 2 $\mu$m and at least 40% have an esd less than 1 $\mu$m. Preferably, the feed to the next (last) grinding stage has a particle size distribution such that not less than 90% by weight have an esd less than 2 $\mu$m and at least 60% have an esd of less than 1 $\mu$m.

The last grinding stage in the method according to the present invention may be followed by one or more further treatment steps. For example, the aqueous suspension of the ground particulate material may be treated by froth flotation as described in GB 2204574 to separate a fine fraction product. The fine fraction product may have particles wherein at least 90% have an esd less than 2 $\mu$m and at least 60% have an esd less than 1 $\mu$m.

In the preferred three or four grinding stage process embodying the invention described above we prefer that the feed suspension to the first of the last three grinding stages comprises at least 40% by weight, preferably at least 50% by weight and most preferably at least 60% by weight (based on its dry weight) of the particulate inorganic solid material. In practice the aqueous suspension at that stage is unlikely to comprise more than 80% by weight of the particulate material.

The last stage of grinding is preferably continued until the particle size distribution of the ground particulate material is such that at least 65% by weight of the particles have an equivalent spherical diameter smaller than 1 $\mu$m.

The particulate material treated by the method according to the present invention may comprise one or more of a calcium carbonate, a calcium sulphate, a barium sulphate or a magnesium silicate all of a natural or synthetic, eg. precipitated, origin. The preferred material is a natural calcium carbonate obtained from a mineral ore source such as chalk or marble. The starting ore may contain minor amounts (eg. up to 10% by weight) of other constituents, eg. feldspar and quartz.

The polycarboxylate dispersing agent added at the various addition sites in the method according to the present invention, which may be the same or different materials (as discussed further hereinafter), preferably comprises a homopolymer or copolymer which contains one or more monomer units comprising a vinyl or olefinic group which is substituted with at least one carboxylic acid group, or a water soluble salt thereof. Examples of suitable monomers are acrylic acid, methacrylic acid, itaconic acid, crotonic acid, fumaric acid, maleic acid, maleic anhydride, isocrotonic acid, aconitic acid, mesaconic acid, sinapinic acid, undecylenic acid, angelic acid and hydroxacrylic acid.

The amount of the dispersing agent added at each addition site in the method according to the present invention may be that represented by from 10 to 100 moles of carboxylate per dry tonne of particulate material.

During grinding, it is not essential that the treated suspension remains (or even starts) in a fully dispersed condition; nevertheless, during grinding, the state of dispersion (controlled by the nature of the dispersing agent, the amount of dispersing agent added and the pH of the treated suspension) should be such that the suspension is sufficiently fluid for grinding to take place with a reasonable input of energy into the grinder. In this respect, the total amount of energy dissipated in the suspension during the grinding stages should not normally be greater than 500 kW hours per tonne of dry pigment. It is normally required that the final suspension will be fully dispersed, and will not require further additions of a dispersing agent to render it fluid.

The weight average molecular weight of the polycarboxylate dispersing agent(s) should be not greater than 20,000, and preferably in the range from 700 to 10,000, as measured by the method of gel permeation chromatography using a low angle laser light scattering detector.

More preferably, the polycarboxylate dispersing agent used in each addition is a homopolymer or copolymer consisting of repeating units of the general formula:

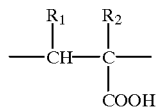

or a water soluble salt thereof,
where $R_1$ is —H, —Alk, —COOH or —COOAlk
and $R_2$ is —H, —CH$_2$, COOH or —Alk
where Alk represents an alkyl group having from 1 to 3 carbon atoms.

A copolymer may also comprise up to 70% of repeating units of the general formula:

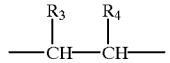

where $R_3$ is —H, —C$_6$H$_5$ or —Alk
and $R_4$ is —Cl, —CN, —COOAlk or —OCOAlk
where Alk represents an alkyl group having from 1 to 3 carbon atoms.

Especially preferred are water soluble salts of homopolymers of acrylic acid, methacrylic acid, maleic acid or fumaric acid, water soluble salts of copolymers of two or more of these monomers, and water soluble salts of copolymers of maleic acid or fumaric acid with styrene or vinyl acetate.

The dispersing agent may be added in the form of an acid or in the form of a salt having as a neutralising cation any one or more of the neutralising cations known in the dispersant art, such as an alkali metal cation, ammonium cation or an alkyl ammonium cation wherein the alkyl group has not more than 7 carbon atoms.

As described above, it is preferred that the method according to the present invention is carried out in at least three grinding stages each of which is associated with a dispersing agent addition site for adding a dispersing agent to the aqueous suspension. It is preferred that each separate addition of dispersing agent constitutes no more than 50% of the total amount of dispersing agent added during grinding. Normally, the number of dispersing agent addition sites is not greater than 10. Preferably, where there are D addition sites, each addition should constitute no greater than (2/D× 100)% of the total addition during the process. More preferably, an equal amount of dispersing agent is added at each addition site.

As described hereinbefore, the aqueous suspension when treated by grinding in one or more of the grinding stages in the method according to the present invention has a pH in the inclusive range 8.5 to 9.8, desirably a pH in the inclusive range 8.5 to 9.5, especially 8.8 to 9.2. We have found that it is beneficial to adjust the pH to be in this range for the following reasons.

In prior art multi-stage grinding processes utilizing a salt of a polycarboxylate as dispersing agent, eg. as described in EP-A-0216002 and U.S. Pat. No. 4,325,514, an undesirable excess of alkali can build up in the aqueous phase. For example, where the dispersing agent comprises sodium polyacrylate an excess of sodium ions can build up. The excess of alkali may increase from stage-to-stage in the multi-stage grinding process. We believe that the reason for such a build-up is as follows. When the dispersing agent interacts with the inorganic particles which it is being employed to disperse, some of the anions of the dispersing agent are neutralised by cations on the particles, eg. calcium where the particles comprise a calcium salt, thereby displacing neutralising cations of the dispersing agent salt, eg. sodium, into solution. This effect becomes greater as the particle size decreases and therefore the overall surface area of the particles being dispersed increases. Without wishing to be bound by any theory, we believe that such an excess of alkali is detrimental to the dispersion process for the following reasons.

(i) The dispersion process relies on adsorption of polymer chains of the dispersing agent onto the particles to be dispersed. The strength of this adsorption is determined by charge effects. Excess alkali is believed to weaken the adsorption by masking the charge attraction.

(ii) The stabilising mechanism is known to be at least in part, steric in origins. With excess alkali in solution, it is believed that there is an increased tendency for the polymer chains to collapse and the steric stability to weaken.

By ensuring that the pH does not fall below the preferred lower limit of 8.5 we can also provide that the dispersing agent anions are always fully neutralised which thereby avoids collapsing of dispersing agent polymer chains caused by another effect, viz insufficient neutralisation.

By adjusting the pH to be in the required range more efficient dispersion of the particles to be ground, and therefore more efficient grinding can be achieved compared with the prior art multi-stage grinding processes referred to hereinbefore. In such processes, the pH of an aqueous suspension of calcium carbonate is 10.0 when neutralised sodium polyacrylate dispersing agent is first added and rises and remains above 10.0 as the effective surface area of the calcium carbonate increases following grinding at the first stage.

Steps to adjust the pH to be in the required range may not be required at all stages. Thus, the dispersing agent added at the first addition stage may comprise a polycarboxylate dispensing agent in its normal fully neutralised state, with no additional additive. A pH adjustment step may be required in one or more of the later stages, especially the last stage, and may be made at the grinding stage(s) or, more preferably, at the dispersing agent addition site(s) associated with the grinding stage(s) where pH adjustment is required.

In the method of the present invention the pH may be adjusted to be in the required range (in the stage(s) where a step is required to adjsut pH) in one of various ways which will be evident to those skilled in the treatment of inorganic mineral suspensions. Thus, in a first example of adjusting pH, a dispersing agent which is a water soluble acid may be added to the suspension to be treated followed by separate addition of an alkali such as sodium hydroxide. The amount of alkali added where added at more than one stage, may be reduced from stage-to-stage whereby the pH of the aqueous phase remains in the required range as the number of available cations on the surface of the particle surfaces to be treated increases as the particle size becomes smaller.

In a second example, a salt of a polycarboxylate dispersing agent, eg. sodium polyacrylate, is added at each addition site or stage and at the stage(s) where a pH adjustment step is required the aqueous medium is diluted with water to reduce its pH and is then preferably reconcentrated by a known dewatering step, eg. filtration. Dilution and reconcentration in this way are described in the present applicant's PCT/GB95/00563 (WO 95/25146). Where the dilution and reconcentration steps are applied at more than one stage, the dilution applied may be greater at the later stage(s).

In a third example, different dispersing agents may be added at different addition stages. Thus, in a first addition stage a fully neutralised polycarboxylate salt may be added as dispersing agent (without any other pH adjustment step) whereas in one or more of the later stages, especially the last addition stage, an acid form of the dispersing agent may be added. Preferably, the basic polymer or copolymer of the different dispersing agents is the same in each case.

In a fourth example, different dispersing agents may be added at the same addition stage, eg. at one or more intermediate stages and/or a final stage. The different agents may comprise a fully neutralised polycarboxylate salt and an acid form of polycarboxylate which may be added separately one after the other in either order. Preferably, the basic polymer or copolymer of the different dispersing agents is the same in each case.

In a fifth example, a partially neutralised polycarboxylate may be added at a final stage and optionally at one or more intermediate stages. Partially neutralised polycarboxylates for use as dispersing agents for pigments are known per se, eg. from JP55-40715. The use of such an agent in grinding mineral materials such as $CaCO_3$ in an aqueous medium is also described in U.S. Pat. No. 4,840,985. However, the process described in that specification is applied in a single stage and under the specific conditions that the particulate mineral material treated is coarse, the partially neutralised agent is added to the grinding medium and the degree of neutralisation of the agent as added is in the range 40% to 96%. In contrast, if in carrying out the method of the present invention it is desired to use the fifth example wherein a partially neutralised polycarboxylate dispersing agent is added, we would contemplate adding the agent under the preferred conditions that the agent is added between grinding stages when the suspension is free of grinding medium, eg. at a pump site, that the particulate material is treated in an intermediate or final grinding stage when the particulate material is fine, ie. more than 50% by weight of the material has an esd less than 2 µm, and that the degree of neutralisation of the agent as added is 30% or less. In this example, the dispersing agent added prior to grinding in the first dispersing agent assisted grinding stage may suitably comprise a fully neutralised polycarboxylate. Preferably, the partially and fully neutralised polycarboxylates used in the different addition stages comprise the same basic polymer or copolymer, eg. a sodium polyacrylate.

In each of the first to fifth examples of adjusting the pH to be in the required range, the dispersing agent and other additive(s) (if any), eg. alkali in the first example, are desirably added whilst the aqueous suspension is being stirred or agitated. This will ensure that the required pH in the aqueous suspension is achieved rapidly, almost instantaneously.

The pH of the suspension may for example be measured by a pH monitor and the amount of dispersing agent added and/or the amount of neutralising material added may be adjusted until the required pH is reached. This adjustment may be carried out automatically by a mechanised addition device working under closed loop control using the measured pH value.

According to an embodiment of the present invention, there is provided a method of grinding an alkaline earth metal pigment comprising the following steps:

(i) forming an aqueous suspension comprising at least 40% by weight of a coarse particulate alkaline earth metal pigment and a polycarboxylate dispersing agent for the pigment, wherein substantially all of the carboxylic acid groups of the polycarboxylate dispersing agent are in a neutralised state;

(ii) grinding the suspension formed in step (i) in a first grinding mill;

(iii) removing from the first grinding mill a portion of the ground suspension having a particle size distribution such that from 50% to 80% by weight of the particles have an e.s.d. smaller than 2 µm;

(iv) adding to the portion removed from the first grinding mill an effective amount of a polycarboxylate dispersing agent;

(v) treating the portion removed from the first mill so that the pH is in the inclusive range 8.5 to 9.8; and (vi) grinding the suspension formed after steps (iv) and (v) in a second grinding mill.

The steps (iv) and (v) may be carried out as a single step by use of a dispersing agent which itself gives the required pH after addition.

Steps (i) to (iv) may be carried out as part of a preferred three grinding stage or four grinding stage process a described hereinbefore. In this case, a step the same as step (v) may be applied prior to each of the last two grinding stages.

The present invention makes it possible to prepare a fluid aqueous suspension of an inorganic particulate material such as a finely divided alkaline earth metal pigment which has improved rheological properties compared with a corresponding suspension prepared by a conventional processes, eg. as described in EP-A-00216002 and U.S. Pat. No. 4,325,514. Thus, by the invention, suspensions can be prepared which are rheologically stable with time, and which contain a relatively high proportion by weight (for instance, 60% by weight or more) of a finely divided pigment, i.e. a pigment having a particle size distribution such that 60% by weight or more of the particles have an equivalent spherical diameter smaller than 1 µm. Under optimum conditions, it is possible, using the present invention, to obtain stable, fluid aqueous suspensions having a particle size distribution such that at least 80%, more preferably at least 90%, by weight or more of the particles have an equivalent spherical diameter smaller than 2 μm and in which the proportion by weight of solids in the suspension is 70% or more. By the invention, it is also possible to form known suspensions, such as those which contain, for example, from 60% to 80% by weight of particles having an e.s.d. smaller than 1 μm, which have improved rheological properties.

According to a second aspect of the present invention there is provided a finely ground particulate material wherein at least 90% by weight of its particles have an equivalent spherical diameter less than 2 μm and at least 60%, desirably at least 75%, by weight of its particles have an equivalent spherical diameter less than 1 μm, the particulate material being the product of the method according to the first aspect of the present invention. The material may be in aqueous suspension or in dry form (obtained by drying the material after treatment to facilitate transport to a user).

For a better understanding of the present invention, and to show how it may be put into effect, reference will now be made to the accompanying drawing which is diagrammatic flow chart of a process embodying the invention.

The processing equipment illustrated in the FIGURE comprises a dry rotary roller grinder 1 which has a perforated base (not shown). A conduit 2 conducts ground particulate alkaline earth metal pigment from an upper region of the grinder 1 to a cyclone 3 which separates insufficiently ground particles from the ground material and returns them to the grinder 1. Sufficiently ground particles pass through a conduit 4 to a mixing tank 5. Water is introduced to the mixing tank 5 through a conduit 6 and a first dispersing agent is introduced through a conduit 7. A pump 8 is provided to transfer material from the mixing tank 5 via a conduit 9 to a first wet attrition grinder 10. A further quantity of the first dispersing agent is introduced to the suspension passing through the pump 8 through the conduit 7. In the first wet attrition grinder 10, the alkaline earth metal pigment is wet ground in the presence of a grinding medium. A sieve 11 is provided at the bottom of the grinder 10. A pump 12 draws a suspension of ground material through the sieve 11 and delivers it through a conduit 13 to a second wet attrition grinder 14. The grinding medium is retained by the sieve 11 and does not pass to the second wet attrition grinder 14. A quantity of a second dispersing agent may be delivered through a conduit 15 to the suspension passing through the pump 12. In the second wet attrition grinder 14, the alkaline earth metal pigment is further wet ground in the presence of a grinding medium. The second attrition grinder 14 is provided with a sieve 16 and an associated pump 17 which draws ground suspension through the sieve 16 and delivers it through a conduit 18 to a third wet attrition grinder 19. The grinding medium is retained by the sieve 16 and does not pass to the third wet attrition grinder 19.

A quantity of a third dispersing agent may be delivered through a conduit 15a to the pump 17. In the third wet attrition grinder 19, the alkaline earth metal pigment is further wet ground in the presence of a grinding medium. A suspension of finely ground material passes through a sieve 20 (leaving behind the grinding medium) and a conduit 21 to a froth flotation cell 22 where a froth flotation process is carried out without dilution of the suspension in accordance with the process described in British Patent Specification No. 2204574, except that no additional collector reagent is used. A stream of fine air bubbles passes upwards through the suspension in the flotation cell and carbonaceous impurities are removed from the suspension as froth at 23. A suspension of the alkaline earth metal pigment which has been substantially freed from carbonaceous impurities is passed through a conduit 24 and a sieve 25 which removes any coarse contamination which may be present. The suspension passing through the sieve 25 is retained in a storage vessel 26.

In the process illustrated in the figure the first, second and third dispersing agents delivered via the conduits 7, 15 and 15a respectively may be the same or different chemicals. The pH of the suspension at each of the pumps 12, 17 where the second and third dispersing agents are added is adjusted to be in the range 8.5 to 9.5 in one of the ways described hereinbefore. The pH of the suspension may for example be measured by a pH monitor and the amount of dispersing agent added and/or the amount of neutralising material added may be adjusted until the required pH is reached. This adjustment may be carried out automatically by a mechanised addition device working under closed loop control using the measured pH value.

The invention will now be illustrated by reference to the following examples.

EXAMPLE 1

Marble chips of up to about 10 mm in size were comminuted in a dry rotary roller grinder to a particle size distribution such that substantially all of the particles were smaller than 50 μm. A suspension was prepared containing about 71% by weight of dry marble and 12.8 moles of carboxyl per dry tonne of marble of a polyacrylate dispersing agent of weight average molecular weight about 6500 having substantially all of the carboxylic acid groups neutralised with sodium, (Dispersant 1). The suspension was introduced into a first attrition grinding mill. Further polyacrylate dispersing agent having substantially all of the carboxylic acid groups neutralised with sodium (Dispersant 1), was added as required into the pump before the first attrition grinding mill. The marble was ground with grinding granules in the size range from 0.5 to 1.0 mm, the weight ratio of grinding granules to marble being 2:1. The suspension was pumped to a second attrition grinding mill, and then to a third attrition grinding mill. Further quantities of polyacrylate dispersing agent were injected into the pumps before each of the second and third attrition grinding mills.

The suspension in each case was treated in one of two alternative ways, viz by Procedure A in which Dispersant 1 was added at all stages with no additional treatment and by Procedure B, viz with Dispersant 1 added with no additional treatment to the suspension at the pump to the first grinding mill followed by addition of a similar dispersant at the subsequent pumps but with the pH of the suspension also adjusted to approximately pH 9. Samples A1 and A2 were prepared by Procedure A and a sample A3 was prepared by Procedure B.

During the grinding stages, heat is generated causing evaporation of water from the suspension. Water was added to maintain the solids content in the range of 76%–79% by weight. The suspension was subjected to froth flotation using fine bubbles of air to remove carbonaceous material from the slurry. The underflow from the froth flotation was screened to remove any unwanted material from the product.

A sample of the product suspension was cooled to room temperature, subjected to a standard agitation procedure and the viscosity measured using a Brookfield viscometer at 100 r.p.m. immediately after agitation and after standing for 1 and 24 hours. ($T_0$, $T_1$ and $T_{24}$).

The results obtained (Samples A1–A3) are set forth in Table 1 which appears at the end of this description.

Additionally, the pH of the suspension at different stages of the grinding process was measured; the results obtained are displayed in Table 2 which appears at the end of this description.

It can be seen that, by the method of the invention, lower viscosity results are obtained, for a higher solids content, when additions of a polyacrylate dispersing agent were made together with the adjustment of the pH during the grinding process. The lower viscosity indicates a less gelatinous (more fluid) suspension, at higher solids content may be obtained, by control of pH (Sample A3) compared with the samples which were prepared by making no pH adjustments (A1 and A2).

EXAMPLE 2

A suspension of the same marble as used in Example 1 was prepared by the same production method as in Example 1. Grinding was continued until 80% by weight of the particles had an equivalent spherical diameter smaller than 1 μm (as measured by a standard gravitational sedimentation technique). A sample of the suspension was cooled to room temperature, subjected to a standard agitation procedure and the viscosity measured using a Brookfield viscometer at 100 r.p.m. immediately after agitation and after standing for 1 and 24 hours. ($T_0$, $T_1$ and $T_{24}$).

The results obtained (Samples B1–B5) are set forth in Table 1 which appears at the end of this description.

Additionally, the pH of the suspension at different stages of the grinding process was measured; the results obtained are displayed in Table 2 which appears at the end of this description.

It can be seen that, by adjustment of pH (Samples B4 and B5) a more fluid suspension, with a higher solids content can be obtained, compared with the samples which were prepared without pH adjustment (B1, B2 and B3), even when the pigment was processed to give a finer particle size distribution than was the case in Example 1.

EXAMPLE 3

A suspension of the same marble as used in Example 1 was prepared by the same production method as in Example 1 with additional polyacrylate dispersing agent as used in Example 1 to form the corresponding sample A1, A2 or A3 as appropriate being injected into the pump at the second attrition grinding stage. Grinding was continued until 90% by weight of the particles had an equivalent spherical diameter smaller than 1 μm. (As measured by a standard gravitational sedimentation technique). A sample of the suspension was cooled to room temperature, subjected to a standard agitation procedure and the viscosity measured using a Brookfield viscometer at 100 r.p.m. immediately after agitation and after standing for 1 and 24 hours. ($T_0$, $T_1$ and $T_{24}$).

The results obtained (Samples C1 and C2) are set forth in Table 1 which appears at the end of this description.

Additionally, the pH of the suspension at different stages of the grinding process was measured; the results obtained are displayed in Table 2 which appears at the end of this description.

It can be seen that, by the method of invention (Sample C2), lower viscosity results are obtained for a very fine product, when additions of a polyacrylate dispersing agent with pH adjustment were made in the grinding process. This indicates that a very fine, fluid product may be obtained by the method of the invention compared with the sample which was prepared without pH adjustment (C1).

TABLE 1

| Sample | Total Dose moles carboxyl/ dry tonne mineral | Solids wt. % | PSD 1 μm Andreasen | Viscosity mPas $T_0$ | $T_1$ | $T_{24}$ |
|---|---|---|---|---|---|---|
| A1 | 47.8 | 76 | 65 | 205 | 460 | 695 |
| A2 | 57.4 | 78 | 65 | 340 | 570 | 820 |
| A3 | 57.4 | 78 | 65 | 165 | 215 | 320 |
| B1 | 77.6 | 76 | 80 | 270 | 550 | 900 |
| B2 | 82.9 | 79 | 80 | 680 | 1140 | 2200 |
| B3 | 82.9 | 78 | 80 | 450 | 840 | 1460 |
| B4 | 79.8 | 79 | 80 | 315 | 425 | 550 |
| B5 | 79.8 | 78 | 80 | 230 | 300 | 400 |
| C1 | 76.6 | 75 | 90 | 280 | 945 | 2490 |
| C2 | 88.3 | 75 | 50 | 220 | 305 | 455 |

TABLE 2

| Sample | pH value at first grinding mill | pH value at second grinding mill | pH value of final product suspension |
|---|---|---|---|
| A1 | 10 | 10 | 10 |
| A2 | 10 | 10 | 10 |
| A3 | 10 | 9.1 | 9.1 |
| B1 | 10 | 10 | 10 |
| B2 | 10 | 10 | 10 |
| B3 | 10 | 10 | 10 |
| B4 | 10 | 8.9 | 8.9 |
| B5 | 10 | 8.9 | 8.9 |
| C1 | 10 | 10 | 10 |
| C2 | 10 | 8.9 | 8.8 |

We claim:

1. A method of preparing a concentrated aqueous suspension of a finely ground particulate material by a multistage grinding process in which an aqueous suspension of the particulate material is passed to and treated by grinding in each of a series of grinding stages, wherein an additive comprising a water soluble polycarboxylate dispersing agent for the particulate material is added to the suspension at each of a plurality of dispersing agent addition sites or stages each associated with a respective stage of the grinding stages, and wherein the additives added at the addition stages associated with the first and last of the said grinding stages are different in that the additive added at the addition stage associated with the first grinding stage comprises a polycarboxylate dispersing agent in its fully neutralized state without any other pH adjustment and the additive added at the addition stage associated with the last grinding stage is such that the pH in the last grinding stage is in the range 8.5 to 9.8.

2. A method as claimed in claim 1 and wherein the pH is 10 or above in the first of the said grinding stages.

3. A method as claimed in claim 1 and wherein there are at least three grinding stages and the aqueous suspension when treated in the penultimate grinding stage has a pH in the range 8.5 to 9.8.

4. A method as claimed in claim 1 and wherein the pH of the aqueous suspension when treated in the last grinding stage, and optionally also in the penultimate grinding stage, is from 8.5 to 9.5.

5. A method as claimed in claim 4 and wherein the pH of the aqueous suspension when treated in the last grinding stage, and optionally also in the penultimate grinding stage, is from 8.8 to 9.2.

6. A method as claimed in claim 5 and wherein the pH of the aqueous suspension in the first grinding stage is at least 10.

7. A method as claimed in claim 1 and wherein the grinding stages are carried out in separate interconnected grinding vessels and the method is carried out as a continuous process in which the aqueous suspension to be treated is continuously passed between the said grinding stages, and whereby progressively finer solid material is being allowed to pass in suspension down the grinding chain.

8. A method as claimed in claim 1 and wherein there are at least three of the said grinding stages and the feed suspension to the first of such stages comprises at least 40% by weight of the particulate inorganic material and wherein the particulate size distribution of the particulate inorganic material in one of the later stages is such that from 50% to 80% by weight of the particles have an esd (equivalent spherical diameter) smaller than 2 $\mu$m.

9. A method as claimed in claim 1 and wherein the energy dissipated in the suspension during each of the said grinding stages is not greater than 500 kW hours per ton of the particulate material being ground on a dry weight basis.

* * * * *